(12) United States Patent
Nagy et al.

(10) Patent No.: US 11,397,089 B2
(45) Date of Patent: Jul. 26, 2022

(54) AUTONOMOUS VEHICLE ROUTING WITH ROUTE EXTENSION

(71) Applicant: UATC, LLC, San Francisco, CA (US)

(72) Inventors: Bryan John Nagy, Allison Park, PA (US); Xiaodong Zhang, Pittsburgh, PA (US); Brett Bavar, Pittsburgh, PA (US); Colin Jeffrey Green, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 758 days.

(21) Appl. No.: 16/173,654

(22) Filed: Oct. 29, 2018

(65) Prior Publication Data

US 2020/0018609 A1 Jan. 16, 2020

Related U.S. Application Data

(60) Provisional application No. 62/697,701, filed on Jul. 13, 2018.

(51) Int. Cl.
*G01C 21/34* (2006.01)
*G05D 1/00* (2006.01)
*G05D 1/02* (2020.01)

(52) U.S. Cl.
CPC ....... *G01C 21/3415* (2013.01); *G05D 1/0088* (2013.01); *G05D 1/021* (2013.01)

(58) Field of Classification Search
CPC ...... G01C 21/34; G01C 21/3415; G05D 1/00; G05D 1/02; G05D 1/021; G05D 1/0088
See application file for complete search history.

(56) References Cited

U.S. PATENT DOCUMENTS

| 7,873,471 B2* | 1/2011 | Gieseke | G01C 21/343 |
| | | | 701/416 |
| 2011/0246061 A1* | 10/2011 | Hayashi | G01C 21/3469 |
| | | | 701/533 |
| 2015/0134242 A1* | 5/2015 | Nakahara | G01C 21/3667 |
| | | | 701/465 |
| 2015/0292894 A1* | 10/2015 | Goddard | G01C 21/3453 |
| | | | 701/400 |
| 2016/0069697 A1* | 3/2016 | Oel | G01C 21/3476 |
| | | | 701/426 |

FOREIGN PATENT DOCUMENTS

WO WO-2017180366 A1 10/2017

\* cited by examiner

*Primary Examiner* — Tan Q Nguyen
(74) *Attorney, Agent, or Firm* — Schwegman Lundberg & Woessner, P.A.

(57) ABSTRACT

Various examples are directed to systems and methods for routing an autonomous vehicle. A vehicle autonomy system may generate first route data describing a first route for the autonomous vehicle to a first target location and control the autonomous vehicle using the first route data. The vehicle autonomy system may determine that the autonomous vehicle is within a threshold of the first target location and select a second target location associated with at least a second stopping location. The vehicle autonomy system may generate second route data describing a route extension of the first route from the first target location to the second target location and control the autonomous vehicle using the second route data.

20 Claims, 12 Drawing Sheets

AUTONOMOUS VEHICLE ROUTING WITH ROUTE EXTENSION

PRIORITY

The application claims the benefit of U.S. Provisional Application Ser. No. 62/697,701 filed on Jul. 13, 2018, which is incorporated herein by reference in its entirety.

FIELD

The document pertains generally, but not by way of limitation, to devices, systems, and methods for operating an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
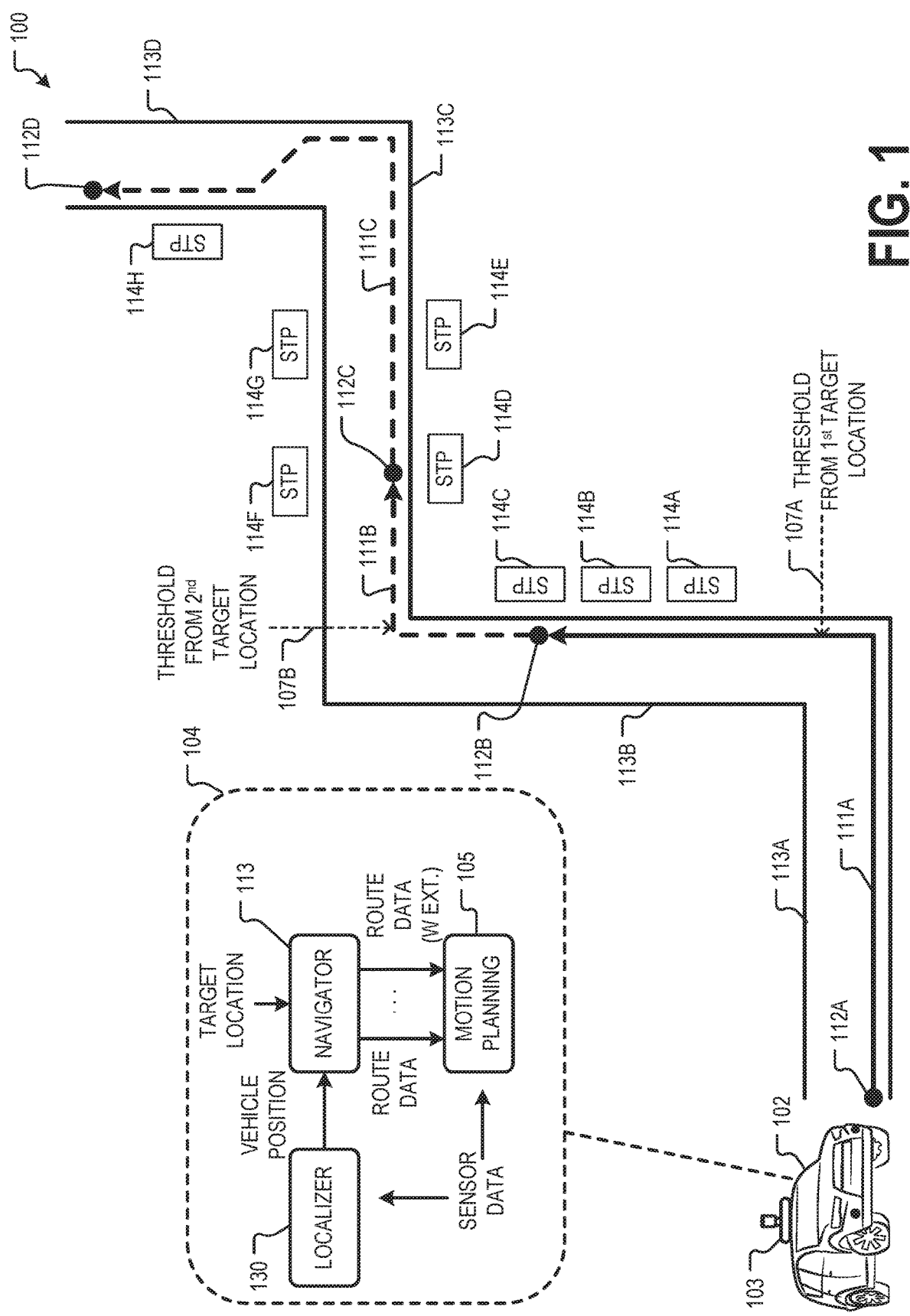
FIG. 1 is a diagram showing one example of an environment for autonomous vehicle routing with route extension.

Examples described herein are directed to systems and methods for routing an autonomous vehicle to a stopping location.

In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input.

A vehicle autonomy system can control an autonomous vehicle along a route to a target location. A route is a path that the autonomous vehicle takes, or plans to take over one or more roadways. In some examples, the target location of a route is associated with one or more stopping locations. A stopping location is a place where the autonomous vehicle can stop to pick-up or drop off one or more passengers, one or more pieces of cargo, or an item. In some examples, the autonomous vehicle can be used to provide ride service for passengers. A stopping location can be a place where the autonomous vehicle can pick up or drop off a passenger. In other examples, the autonomous vehicle can be used to provide a delivery service of food or other purchased items. A stopping location can be a place where the autonomous vehicle parks to pick up an item or items for delivery or a place where the autonomous vehicle can make a delivery of an item or items to a customer. Non-limiting examples of stopping locations include parking spots, driveways, roadway shoulders, and loading docks. A stopping location can also be referred to as a pick-up/drop-off zone (PDZ).

A stopping location can be available for stopping or unavailable for stopping. A stopping location is available for stopping if there is space at the stopping location for the vehicle to stop and pick-up or drop-off a passenger, cargo, or an item. For example, a single-vehicle parking spot is available for stopping if no other vehicle is present. A roadway shoulder location is available for stopping if there is an unoccupied portion of the roadway shoulder that is large enough to accommodate the autonomous vehicle. In many applications, the vehicle autonomy system does not know if a particular stopping location is available until the stopping location is within the range of the autonomous vehicle's sensors. If a first stopping location is unavailable, the autonomous vehicle can wait until the first stopping location is available or, for example, move on to a next stopping location associated with the route target location. If all stopping locations associated with a target location are unavailable, the vehicle autonomy system may generate a new route that passes additional stopping locations.

By the time the autonomous vehicle has passed within sensor range of all stopping locations associated with the initial route target, however, the vehicle autonomy system may already be slowing the vehicle as it approaches the end of the previous route. Accordingly, the autonomous vehicle's motion can seem jerky or uneven as it slows to approach the first target location and then accelerates again to traverse the new route.

Various embodiments described herein address these and other challenges by implementing autonomous vehicle routing with route extension. The vehicle autonomy system generates route data describing a first route for the autonomous vehicle to an initial target location. The initial target location is associated with one or more stopping locations. Consider an example in which the autonomous vehicle is to drop-off a rider. The initial target location can be the place where the rider wants to be dropped-off, such as a particular address. Stopping locations associated with the target location can include parking spots, shoulder locations, and so on, that are at or near the address. The vehicle autonomy system can direct the autonomous vehicle past the stopping locations associated with the target location. The vehicle autonomy system is programmed to stop the autonomous vehicle at the first available stopping location that is encountered.

In various embodiments, the vehicle autonomy system is programmed to preemptively extend the route of the autonomous vehicle when the autonomous vehicle comes within a threshold of the initial target location. The threshold, in some examples, is a time threshold (e.g., X seconds before the autonomous vehicle is projected to arrive at the target location). Also, in some examples, the threshold is a distance threshold (e.g., Y meters from the target location). When the autonomous vehicle is within the threshold of the target location, the vehicle autonomy system determines a route extension from the initial target location and ending at a second target location. The second target location is also associated with at least one stopping location. The vehicle autonomy system continues to control the autonomous vehicle according to the initial route until the autonomous vehicle reaches the target location or stops at an available stopping location. If the autonomous vehicle does not encounter any available stopping locations before reaching the first target location, then the vehicle autonomy system begins to control the autonomous vehicle according to the route extension. The vehicle autonomy system continues to generate route extensions in this way until the autonomous vehicle successfully stops at a stopping location or otherwise ceases to travel.

The time and/or distance threshold can be selected such that the route extension is implemented before the autonomous vehicle would have otherwise begun to slow down as it approached the first target location. In this way, the autonomous vehicle continues to move in a smooth manner even if all the stopping locations associated with the initial target location are unavailable. In some examples, route extension can reduce the demand for fast processing at the autonomous vehicle. For example, real-time operations of the vehicle autonomy system, such as localization and motion planning, operate at a high frequency and may be assigned higher priority use of processing resources. Generating route extensions in the manner described herein may reduce the need to generate the route extensions quickly. This may allow route planning to be implemented with lower priority use of processing resources without excessive sacrificing of routing quality.

FIG. 1 is a diagram showing one example of an environment 100 for autonomous vehicle routing with route extension. The environment 100 includes a vehicle 102. The vehicle 102 can be a passenger vehicle such as a car, a truck, a bus, or other similar vehicle. The vehicle 102 can also be a delivery vehicle, such as a van, a truck, a tractor trailer, etc. The vehicle 102 is a self-driving vehicle (SDV) or autonomous vehicle (AV) including a vehicle autonomy system 104 that is configured to operate some or all of the controls of the vehicle 102 (e.g., acceleration, braking, steering). The vehicle autonomy system 104 is configured to perform route extension, as described herein.

In some examples, the vehicle autonomy system 104 is operable in different modes, where the vehicle autonomy system 104 has differing levels of control over the vehicle 102 in different modes. In some examples, the vehicle autonomy system 104 is operable in a full autonomous mode in which the vehicle autonomy system 104 has responsibility for all or most of the controls of the vehicle 102. In addition to or instead of the full autonomous mode, the vehicle autonomy system 104, in some examples, is operable in a semi-autonomous mode in which a human user or driver is responsible for some or all of the control of the vehicle 102. Additional details of an example vehicle autonomy system are provided in FIG. 3.

The vehicle 102 has one or more remote-detection sensors 103 that receive return signals from the environment 100. Return signals may be reflected from objects in the environment 100, such as the ground, buildings, trees, etc. The remote-detection sensors 103 may include one or more active sensors, such as LIDAR, RADAR, and/or SONAR that emit sound or electromagnetic radiation in the form of light or radio waves to generate return signals. The remote-detection sensors 103 can also include one or more passive sensors, such as cameras or other imaging sensors, proximity sensors, etc., that receive return signals that originated from other sources of sound or electromagnetic radiation. Information about the environment 100 is extracted from the return signals. In some examples, the remote-detection sensors 103 include one or more passive sensors that receive reflected ambient light or other radiation, such as a set of monoscopic or stereoscopic cameras. Remote-detection sensors 103 provide remote sensor data that describes the environment 100. The vehicle 102 can also include other types of sensors, for example, as described in more detail with respect to FIG. 3.

The vehicle autonomy system generates an initial route 111A extending from a starting location 112A to an initial target location 112B. The starting location 112A can be a current vehicle position and/or a position to which the vehicle 102 will travel to begin the route 111A. The route 111A describes a path of travel over one or more roadways including, for example, turns from one roadway to another, exits on or off a roadway, etc. In some examples, the route 111A also specifies lanes of travel, for example, on roadways having more than one lane of travel. In this example, the initial route 111A extends along two roadways 113A, 113B, although, in various examples, routes extend over more or fewer than two roadways 113A, 113B.

As shown in FIG. 1, the target location 112B is associated with stopping locations 114A, 114B, 114C. For example, where there target location 112B is at or near a city block, stopping locations 114A, 114B, 114C can be shoulders or curb-side areas on the city block where the vehicle 102 can pull-over. The stopping locations 114A, 114B, 114C associated with the target location 112B can be stopping locations that are within a threshold distance of the target location 112B. In some examples, the stopping locations 114A, 114B, 114C associated with the target location 112B are based on the direction of travel of the vehicle 102. For example, in the United States where traffic travels on the right-hand side of the roadway, stopping locations on the right-hand shoulder of the roadway relative to the vehicle 102 are associated with a target location, such as 112B, while stopping locations on the left-hand shoulder of the roadway may not, as it may not be desirable for the vehicle 102 to cross traffic to reach the left-hand shoulder of the roadway.

The vehicle autonomy system 104 controls the vehicle 102 along the route 111A towards the target location 112B. For example, the vehicle autonomy system 104 controls one or more of the steering, braking, and acceleration of the vehicle 102 to direct the vehicle 102 along the roadway according to the route 111A. The vehicle autonomy system 104 also monitors whether the vehicle 102 is within a threshold of the target location 112B. The threshold can be a time threshold and/or a distance threshold.

According to a time threshold, the vehicle autonomy system 104 monitors an estimated time remaining before the vehicle 102 arrives at the target location 112B. For example, the vehicle autonomy system 104 can estimate the vehicle's projected speed over the remainder of the route 111A. The projected speed for the vehicle 102 can be based on the speed limit of the roadways to be traversed to reach the target location 112B, traffic conditions on the roadways to be traversed to reach the target location 112B, and/or other suitable factors. The vehicle 102 is within the threshold of the target location 112B if the time remaining to the target location 112B is less than the time threshold.

According to a distance threshold, the vehicle autonomy system 104 monitors a distance to the target location 112B. For example, the vehicle autonomy system 104 can find a distance, according to the route 111A, between the vehicle's current vehicle position and the target location 112B. The vehicle 102 is within the threshold of the target location 112B if the distance to the target location 112B is less than the distance threshold.

The vehicle autonomy system 104 can implement a distance threshold or time threshold individually or together. In an example where time and distance thresholds are implemented together, the vehicle 102 is within the threshold of the target location 112B if the estimated time remaining to the target location 112B is less than a time threshold or if the distance to the target location 112B is less than a distance threshold. In other examples, the vehicle autonomy system 104 can implement time and distance thresholds conjunctively. For example, the vehicle 102 is within the threshold of the target location 112B if the estimated time remaining to the target location 112B is less than the time threshold and the distance to the target location 112B is less than a threshold distance.

In the example of FIG. 1, the vehicle 102 is within the threshold of the target position 112B at the point indicated by arrow 107A. When the vehicle is within the threshold of the target position 112B, the vehicle autonomy system 104 begins generating a route extension 111B to a second target location 112C. In this example, the route extension 111B traverses the roadway 113B and the roadway 113C with a right turn from the roadway 113B to the roadway 113C.

The second target location 112C has additional stopping locations 114D, 114E associated with it. In the example of FIG. 1, stopping locations 114F, 114G are shoulder locations on the left-hand side of the roadway relative to the vehicle's direction of travel and, therefore, may not be associated with the second target position 112B. The vehicle autonomy system 104 generates the route extension 111B before the vehicle 102 reaches the target location 112B. In this way, if the stopping locations 114A, 114B, 114C associated with the target location 112B are not available, the vehicle 102 can immediately begin traversing the route extension without waiting for the route extension to be generated by the vehicle autonomy system 104.

In the example of FIG. 1, the vehicle 102 is within the threshold of the second target location 112C at the position indicated by the arrow 107B. At this point, the vehicle autonomy system 104 begins to generate an additional route extension 111C to a third target location 112D. The route extension 111C, in this example, traverses roadways 113C and 113D, with a left turn from roadway 113C to roadway 113D. The third target location 112D is associated with at least one additional stopping location 114H.

The route extensions 111B, 111C and/or subsequent target positions 112C, 112D can be determined in any suitable manner. In some examples, the vehicle autonomy system 104 generates the initial route 111A using a ranked list of stopping locations. The stopping locations are ranked, for example, considering one or more factors related to the utility of the stopping positions. For example, stopping locations can be ranked based on one or more of a number of factors including, distance from the target location 112B, distance or time that the cargo or passenger would have to travel to or from the stopping point, or ease of entry or exist. For example, in some embodiments where the stopping locations are used to pick up a passenger or cargo, the stopping locations can be ranked at least in part based on how far the passenger and/or cargo would have to move to be picked-up by the vehicle 102 at the respective stopping locations. In some examples, stopping locations can also be ranked based at least in part on ease of entry or exit. For example, a roadway shoulder stopping location may have a higher ease of exit, and therefore a higher utility, than a stopping location where the vehicle 102 pulls into and must subsequently back out into traffic to leave the stopping location.

The vehicle autonomy system 104 can select the initial route 111A based on the highest-ranked stopping location or locations. For example, in FIG. 1, the stopping locations may be ranked, as indicated by TABLE 1 below, based on distance to the target location 112B.

TABLE 1

| Rank | Stopping Location |
|------|-------------------|
| 1 | 114C |
| 2 | 114B |
| 3 | 114A |
| 4 | 114D |
| 5 | 114E |
| 6 | 114H |
| 7 | 114G |
| 8 | 114F |

The example stopping location rankings shown in TABLE 1 are based on distance from the target location 112B. As described herein, in some examples, rankings of stopping locations can be based on other factors instead of or in addition to distance from the target location 112B, such as, for example, the distance that a passenger and/or cargo must travel to reach the stopping location, or ease of entry and exit.

In the example of TABLE 1, the stopping locations 114A, 114B, 114C are ranked highest. When the vehicle autonomy system 104 generates the route extension 111B, the vehicle autonomy system 104 selects a second target location 112C and route extension 111B that takes the vehicle 102 past the stopping locations 114D, 114E, which are ranked next below the stopping locations 114A, 114B, 114C associated with the first target location 112B.

In other examples, the vehicle autonomy system 104 generates a set of candidate route extensions. The vehicle autonomy system 104 evaluates the set of candidate route extensions and selects as the route extension 111B, the candidate route extension that passes the most stopping locations.

In some examples, the vehicle autonomy system 104 is programmed to select route extensions to avoid short cuts and/or loops. A short cut occurs when the vehicle autonomy system 104 fails to pass all of the stopping locations associated with a target location. A loop occurs when the vehicle autonomy system 104 passes stopping locations associated with a target location more than once.

The vehicle autonomy system 104 can detect loops and short cuts at the time that it generates a route extension. In some examples, the vehicle autonomy system 104 can be programmed to avoid route extensions that include loops and/or short cuts. In some examples, the vehicle autonomy system 104 is programmed to detect and eliminate short cuts. For example, if a target location for a route extension is chosen because the route passes a defined set of stopping locations, the vehicle autonomy system 104 can be programmed to verify that candidate route extensions actually pass all of the stopping locations of the set to avoid short cuts and/or that candidate route extensions pass associated stopping locations only once to avoid loops.

In other examples, the vehicle autonomy system 104 is programmed to limit the length of route extensions. For example, a motion planning system 105 can be programmed to cause the vehicle 102 to deviate from a route or route extension, for example, if the motion planning system 105 determines a faster way to reach the target location 112B in view of roadway conditions or objects in the environment 100. Shorter route extensions provide fewer opportunities for the motion planning system 105 to add loops or short cuts to a route extension. The length of a route extension can be limited based on time or distance. For example, a candidate route extension may not be used if it adds more than an extension threshold distance and/or if it adds more than an extension threshold time.

In some examples, the systems and methods described herein, can be implemented by a vehicle autonomy system 104 that separates the process of stopping the vehicle 102 at a stopping location from generating routes and/or route extensions. For example, the vehicle autonomy system 104 of FIG. 1 includes a localizer system 130, a navigator system 113, and the motion planning system 105. The navigator system 113 is configured to generate routes, including route extensions. The motion planning system 105 is configured to determine whether stopping locations associated with a target location are available and cause the vehicle to stop at a stopping location that is available. The navigator system 113 continues to generate route extensions, as described herein, until the motion planning system 105 causes the vehicle 102 to stop at a stopping location.

The localizer system 130 can receive sensor data from remote detection sensors 103 (and/or other sensors) to generate a vehicle position. In some examples, the localizer system 130 generates a vehicle pose including the vehicle position and vehicle attitude, described in more detail herein. The vehicle position generated by the localizer system 130 is provided to the navigator system 113. The navigator system 113 also receives and/or accesses target location data describing the vehicle's initial target location. The target location data can be received from a user, from a dispatch system, from another component of the vehicle autonomy system 104 and/or from another suitable source. Using the target location data and the vehicle position, the navigator system 113 generates route data describing the first route 111A. The route data can include an indication of the route 111A and of stopping locations 114A, 114B, 114C associated with the route 111A. The route data is provided to the motion planning system 105.

The motion planning system 105 uses the route data to control the vehicle 102 along the route 111A. For example, the motion planning system 105 sends control commands to the throttle, steering, brakes, and/or other controls of the vehicle 102 to cause the vehicle 102 to traverse the route 111A. The motion planning system 105 is programmed to stop the vehicle 102 if the vehicle 102 approaches an available stopping location 114A, 114B, 114C associated with the route 111A. The navigator system 113 continues to generate route data describing route extensions, for example, until the motion planning system 105 successfully stops the vehicle 102 at a stopping location. In this way, the navigator system 113 may not consider whether any particular stopping location is available when the vehicle 102 encounters it.

Figure 2:
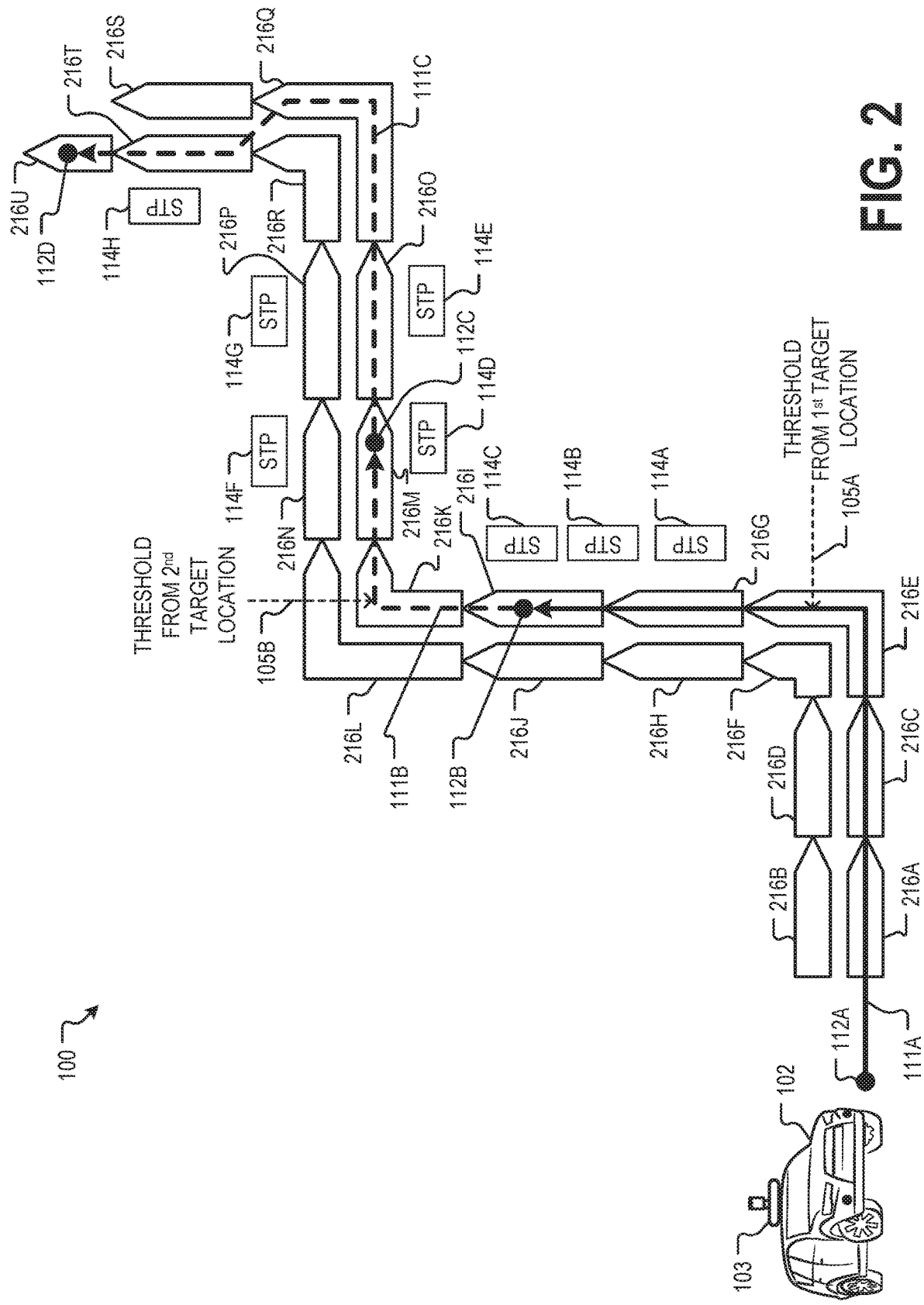
FIG. 2 is a diagram showing one example of the environment of FIG. 1 with the route and route extensions illustrated with collections of lane segments.

FIG. 2 is a diagram showing one example of the environment 100 of FIG. 1 with the route 111A and route extensions 111B, 111C illustrated with collections of lane segments 216A-U. For example, the route 111A traverses lane segments 216A, 216C, 216E, 216G, and 216I. Route extension 111B traverses lane segments 216I, 216K, and 216M. Route extension 111C traverses lane segments 216O, 216Q, 216T, and 216U.

FIG. 2 is shown to illustrate one example way that the vehicle autonomy system 104 (e.g., the navigator system 113 thereof) can generate routes 111A and route extensions 111B, 111C. For example, each lane segment 216A-U and/or transition between lane segments is associated with a cost. The cost of a lane segment can be based on the time that is added to a trip by traveling the lane segment. For example, a lane segment 216A-U that leads way from a target location 112A, 112B, 112C or is directed away from a target location 112A, 112B, 112C or represents a less-direct route can be associated with a higher cost. Similarly, a lane segment with a lower speed limit can be associated with a higher cost.

To generate a route and/or route extension, the navigator system 113 receives map data describing the lane segments 216A-U and properties thereof (e.g., speed limit, traffic status) The navigator system 113 receives and/or calculates a cost for some or all of the lane segments 216A-U using the properties of the lane segments 216A-U and the target location. The navigator system 113 then determines a lowest cost route from the starting location 112A to the target location, for example, using a suitable path planning algorithm, such as A*, D*, Dijkstra's algorithm, etc. In some examples, a path planning algorithm can be applied from the starting location 112A to the target location 112B. In other examples, instead of beginning with the starting position 112A, the navigator system 113 applies the path planning algorithm starting at the target location 112B and moves backwards until reaching the starting position 112A.

In some examples, the motion planning system 105 is configured to deviate from a route while traveling in response to conditions in the environment 100. For example, if the motion planning system 105 detects modification to a route that lowers the cost or increases the reward, it may implement the modification. Consider an example in which there is an obstruction in a lane segment that is part of a route or route extension 111A, 111B, 111C, the motion planning system 105 can cause the vehicle 102 to change lanes or take an alternate route. Deviation from a route by the motion planning system can cause short cuts and/or loops in a route extension that may be addressed as described herein.

Figure 3:
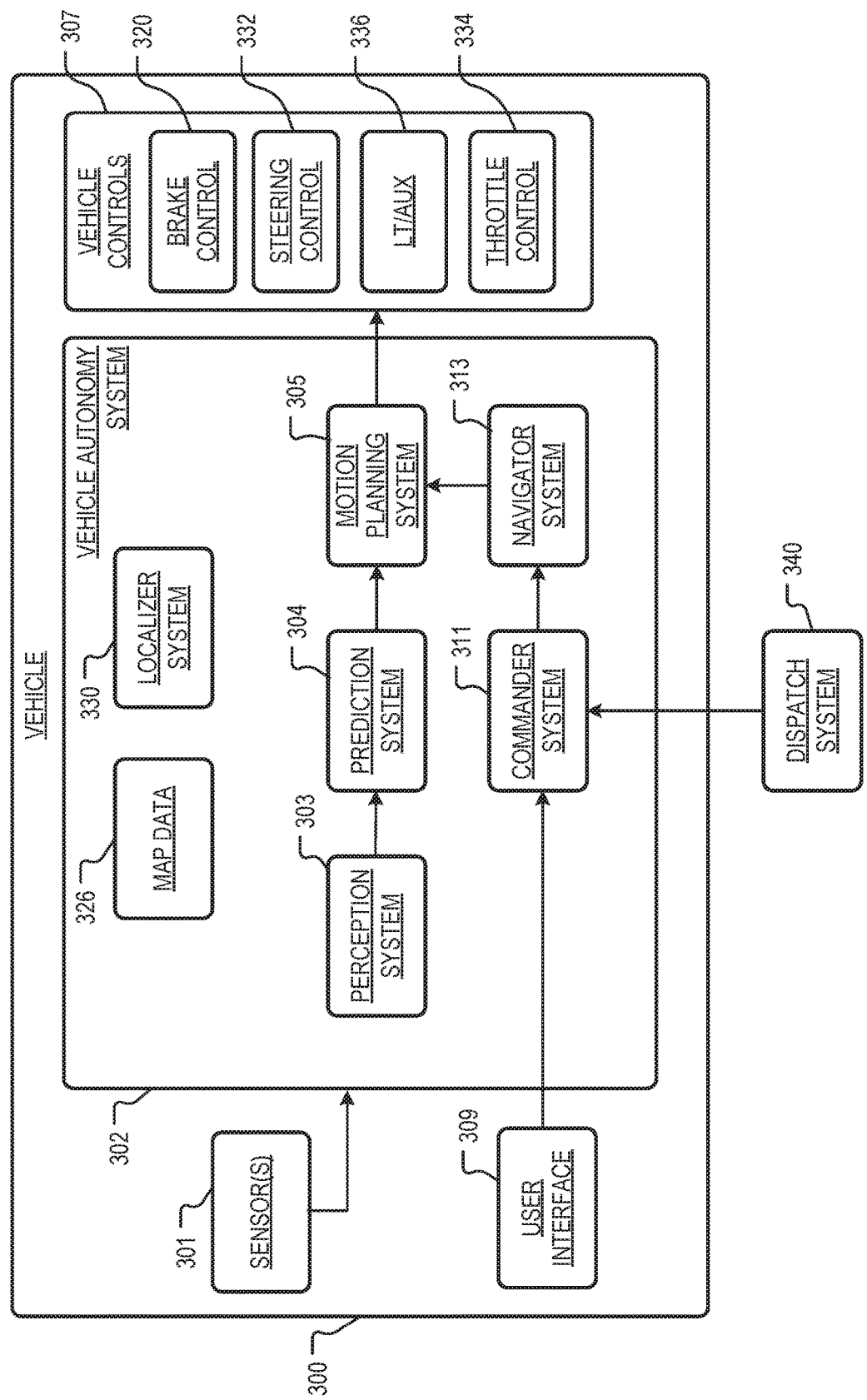
FIG. 3 depicts a block diagram of an example vehicle according to example aspects of the present disclosure.

FIG. 3 depicts a block diagram of an example vehicle 300 according to example aspects of the present disclosure. The vehicle 300 includes one or more sensors 301, a vehicle autonomy system 302, and one or more vehicle controls 307. The vehicle 300 can be an autonomous vehicle, as described herein.

The vehicle autonomy system 302 includes a commander system 311, a navigator system 313, a perception system 303, a prediction system 304, a motion planning system 305, and a localizer system 330 that cooperate to perceive the surrounding environment of the vehicle 300 and determine a motion plan for controlling the motion of the vehicle 300 accordingly.

The vehicle autonomy system 302 is engaged to control the vehicle 300 or to assist in controlling the vehicle 300. In particular, the vehicle autonomy system 302 receives sensor data from the one or more sensors 301, attempts to comprehend the environment surrounding the vehicle 300 by performing various processing techniques on data collected by the sensors 301, and generates an appropriate route through the environment. The vehicle autonomy system 302 sends commands to control the one or more vehicle controls 307 to operate the vehicle 300 according to the route.

Various portions of the vehicle autonomy system 302 receive sensor data from the one or more sensors 301. For example, the sensors 301 may include remote-detection sensors as well as motion sensors such as an inertial measurement unit (IMU), one or more encoders, or one or more odometers. The sensor data can include information that describes the location of objects within the surrounding environment of the vehicle 300, information that describes the motion of the vehicle 300, etc.

The sensors 301 may also include one or more remote-detection sensors or sensor systems, such as a LIDAR, a RADAR, one or more cameras, etc. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 301 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 301 can include a positioning system. The positioning system determines a current position of the vehicle 300. The positioning system can be any device or circuitry for analyzing the position of the vehicle 300. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points) and/or other suitable techniques. The position of the vehicle 300 can be used by various systems of the vehicle autonomy system 302.

Thus, the one or more sensors 301 can be used to collect sensor data that includes information that describes the location (e.g., in three-dimensional space relative to the vehicle 300) of points that correspond to objects within the surrounding environment of the vehicle 300. In some implementations, the sensors 301 can be positioned at various different locations on the vehicle 300. As an example, in some implementations, one or more cameras and/or LIDAR sensors can be located in a pod or other structure that is mounted on a roof of the vehicle 300 while one or more RADAR sensors can be located in or behind the front and/or rear bumper(s) or body panel(s) of the vehicle 300. As another example, camera(s) can be located at the front or rear bumper(s) of the vehicle 300. Other locations can be used as well.

The localizer system 330 receives some or all of the sensor data from sensors 301 and generates vehicle poses for the vehicle 300. A vehicle pose describes the position and attitude of the vehicle 300. The vehicle pose (or portions thereof) can be used by various other components of the vehicle autonomy system 302 including, for example, the perception system 303, the prediction system 304, the motion planning system 305 and the navigator system 313.

The position of the vehicle 300 is a point in a three-dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote sensor data) to map data 326 describing the surrounding environment of the vehicle 300.

In some examples, the localizer system 330 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 can be provided to various other components of the vehicle autonomy system 302. For example, the commander system 311 may utilize a vehicle position to determine whether to respond to a call from a dispatch system 340.

The commander system 311 determines a set of one or more target locations that are used for routing the vehicle 300. The target locations can be determined based on user input received via a user interface 309 of the vehicle 300. The user interface 309 may include and/or use any suitable input/output device or devices. In some examples, the commander system 311 determines the one or more target locations considering data received from the dispatch system 340. The dispatch system 340 can be programmed to provide instructions to multiple vehicles, for example, as part of a fleet of vehicles for moving passengers and/or cargo. Data from the dispatch system 340 can be provided via a wireless network, for example.

The navigator system 313 receives one or more target locations from the commander system 311 or user interface 309 along with map data 326. Map data 326, for example, may provide detailed information about the surrounding environment of the vehicle 300. Map data 326 can provide information regarding identity and location of different roadways and segments of roadways (e.g., lane segments). A roadway is a place where the vehicle 300 can drive and may include, for example, a road, a street, a highway, a lane, a parking lot, or a driveway.

From the one or more target locations and the map data 326, the navigator system 313 generates route data describing a route for the vehicle to take to arrive at the one or more target locations. The navigator system 313, in some examples, also generates route data describing route extensions, as described herein.

In some implementations, the navigator system 313 determines route data or route data based on applying one or more cost functions and/or reward functions for each of one or more candidate routes for the vehicle 300. For example, a cost function can describe a cost (e.g., a time of travel) of adhering to a particular candidate route while a reward function can describe a reward for adhering to a particular candidate route. For example, the reward can be of a sign opposite to that of cost. Route data is provided to the motion planning system 305, which commands the vehicle controls 307 to implement the route or route extension, as described herein.

The perception system 303 detects objects in the surrounding environment of the vehicle 300 based on sensor data, map data 326 and/or vehicle poses provided by the localizer system 330. For example, map data 326 used by the perception system may describe roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 302 in comprehending and perceiving its surrounding environment and its relationship thereto.

In some examples, the perception system 303 determines state data for one or more of the objects in the surrounding environment of the vehicle 300. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 300; minimum path to interaction with the vehicle 300; minimum time duration to interaction with the vehicle 300; and/or other state information.

In some implementations, the perception system 303 can determine state data for each object over a number of iterations. In particular, the perception system 303 updates the state data for each object at each iteration. Thus, the perception system 303 detects and tracks objects, such as vehicles, that are proximate to the vehicle 300 over time.

The prediction system 304 is configured to predict one or more future positions for an object or objects in the environment surrounding the vehicle 300 (e.g., an object or objects detected by the perception system 303). The prediction system 304 generates prediction data associated with one or more of the objects detected by the perception system 303. In some examples, the prediction system 304 generates prediction data describing each of the respective objects detected by the prediction system 304.

Prediction data for an object can be indicative of one or more predicted future locations of the object. For example, the prediction system 304 may predict where the object will be located within the next 5 seconds, 20 seconds, 300 seconds, etc. Prediction data for an object may indicate a predicted trajectory (e.g., predicted path) for the object within the surrounding environment of the vehicle 300. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 can use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left-turn for the vehicle 300 such that the vehicle 300 turns left at the intersection. Similarly, the prediction system 304 determines predicted trajectories for other objects, such as bicycles, pedestrians, parked vehicles, etc. The prediction system 304 provides the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object, and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 commands the vehicle controls based at least in part on the predicted trajectories associated with the objects within the surrounding environment of the vehicle 300, the state data for the objects provided by the perception system 303, vehicle poses provided by the localizer system 330, map data 326, and route data provided by the navigator system 313. Stated differently, given information about the current locations of objects and/or predicted trajectories of objects within the surrounding environment of the vehicle 300, the motion planning system 305 determines control commands for the vehicle 300 that best navigate the vehicle 300 along the route or route extension relative to the objects at such locations and their predicted trajectories on acceptable roadways.

In some implementations, the motion planning system 305 can also evaluate one or more cost functions and/or one or more reward functions for each of one or more candidate control commands or sets of control commands for the vehicle 300. Thus, given information about the current locations and/or predicted future locations/trajectories of objects, the motion planning system 305 can determine a total cost (e.g., a sum of the cost(s) and/or reward(s) provided by the cost function(s) and/or reward function(s)) of adhering to a particular candidate control command or set of control commands. The motion planning system 305 can select or determine a control command or set of control commands for the vehicle 300 based at least in part on the cost function(s) and the reward function(s). For example, the motion plan that minimizes the total cost can be selected or otherwise determined.

In some implementations, the motion planning system 305 can be configured to iteratively update the route or route extension for the vehicle 300 as new sensor data is obtained from one or more sensors 301. For example, as new sensor data is obtained from one or more sensors 301, the sensor data can be analyzed by the perception system 303, the prediction system 304, and the motion planning system 305 to determine the motion plan.

The motion planning system 305 can provide control commands to one or more vehicle controls 307. For example, the one or more vehicle controls 307 can include throttle systems, brake systems, steering systems, and other control systems, each of which can include various vehicle controls (e.g., actuators or other devices that control gas flow, steering, braking) to control the motion of the vehicle 300. The various vehicle controls 307 can include one or more controllers, control devices, motors, and/or processors.

The vehicle controls 307 can include a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, brakes the vehicle 300. The secondary system may be configured to determine a failure of the primary system to brake the vehicle 300 in response to receiving the braking command.

A steering control system 332 is configured to receive a steering command and bring about a response in the steering mechanism of the vehicle 300. The steering command is provided to a steering system to provide a steering input to steer the vehicle 300.

A lighting/auxiliary control module 336 receives a lighting or auxiliary command. In response, the lighting/auxiliary control module 336 controls a lighting and/or auxiliary system of the vehicle 300. Controlling a lighting system may include, for example, turning on, turning off, or otherwise modulating headlines, parking lights, running lights, etc. Controlling an auxiliary system may include, for example, modulating windshield wipers, a defroster, etc.

A throttle control system 334 is configured to receive a throttle command and bring about a response in the engine speed or other throttle mechanism of the vehicle. For example, the throttle control system 334 can instruct an engine and/or engine controller, or other propulsion system component to control the engine or other propulsion system of the vehicle 300 to accelerate, decelerate, or remain at its current speed.

Each of the perception system 303, the prediction system 304, the motion planning system 305, the commander system 311, the navigator system 313, and the localizer system 330, can be included in or otherwise a part of a vehicle autonomy system 302 configured to control the vehicle 300 based at least in part on data obtained from one or more sensors 301. For example, data obtained by one or more sensors 301 can be analyzed by each of the perception system 303, the prediction system 304, and the motion planning system 305 in a consecutive fashion in order to control the vehicle 300. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 302 includes one or more computing devices, which may implement all or parts of the perception system 303, the prediction system 304, the motion planning system 305 and/or the localizer system 330. Descriptions of hardware and software configurations for computing devices to implement the vehicle autonomy system 302 and/or the vehicle autonomy system 104 are provided herein at FIGS. 11 and 12.

Figure 4:
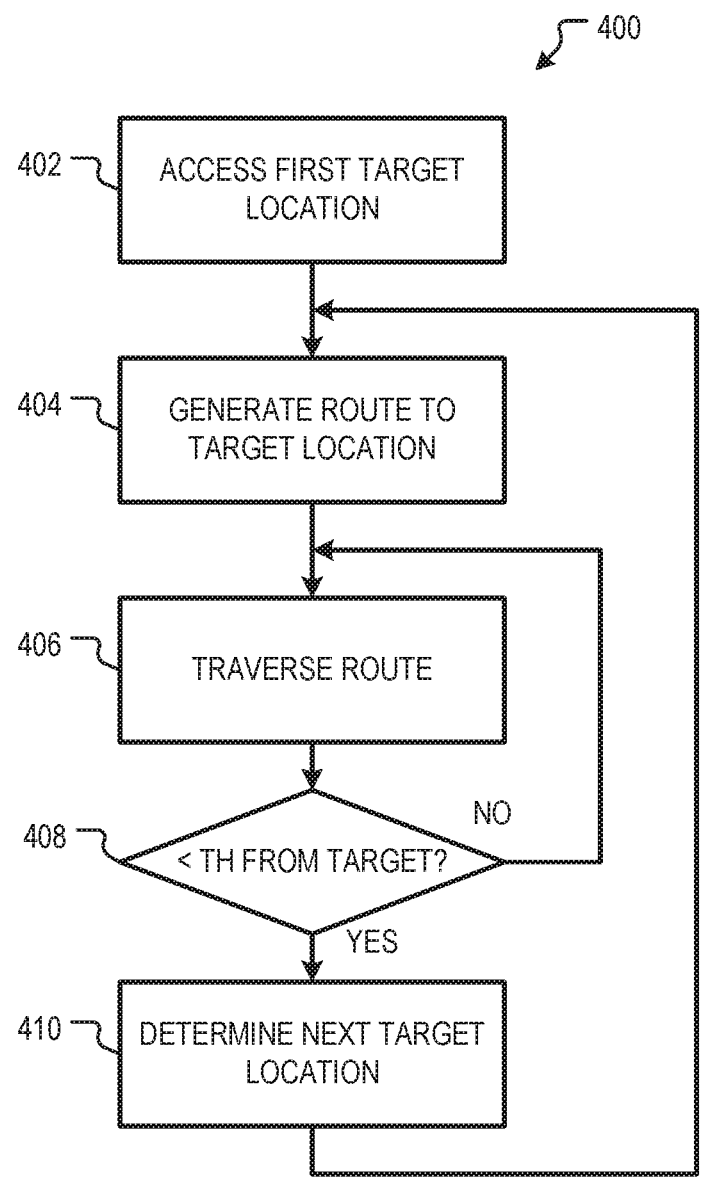
FIG. 4 is a flowchart showing one example of a process flow that can be executed by a vehicle autonomy system to implement route extensions.

FIG. 4 is a flowchart showing one example of a process flow 400 that can be executed by a vehicle autonomy system (e.g., a navigator system thereof) to implement route extensions. As shown, the vehicle autonomy system determines when the vehicle is within a threshold from a current target location. As described herein, the threshold can be a threshold time and/or a threshold distance. If the vehicle is within the threshold of the target location, the vehicle autonomy system determines and develops a route extension.

At operation 402, the vehicle autonomy system accesses a first target location. The first target location can be received from a user via a user interface, such as the user interface 309 of FIG. 3. In some examples, the first target location is received from a dispatch system, such as dispatch system 340 of FIG. 3. The first target location can be associated with one or more stopping locations, as described herein.

At operation 404, the vehicle autonomy system generates a route to the target location. The vehicle autonomy system can generate the route in various different ways including, for example, those described herein. At operation 406, the vehicle autonomy system begins controlling the vehicle to traverse the route determined at operation 404. This can include controlling one or more of the vehicle's throttle, steering, and braking.

At operation 408, the vehicle autonomy system determines if the vehicle is less than a threshold from the next target location. As described herein, the threshold can be a threshold time, a threshold distance, a conjunctive combination of a time threshold and a distance threshold, a disjunctive combination of a time threshold and a distance threshold, etc. If the vehicle is not within the threshold of the target location, the vehicle autonomy system continues to traverse the route at operation 406. If the vehicle is less than the threshold from the target location, it determines a next target location at operation 410. This can include generating a route extension, as described herein. Upon determining a next target location, the vehicle autonomy system generates a route to the next target location at operation 404. The process flow 400 can continue until the vehicle successfully reaches a stopping location or until the process flow 400 is otherwise ended.

Figure 5:
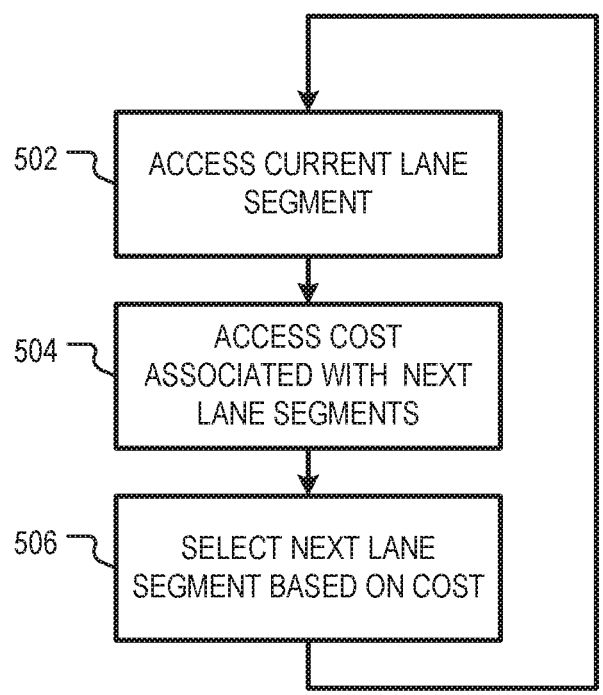
FIG. 5 is a flowchart showing one example of a process flow that can be executed by a vehicle autonomy system to generate a route or route extension.

FIG. 5 is a flowchart showing one example of a process flow 500 that can be executed by a vehicle autonomy system (e.g., a navigator system thereof) to generate a route or route extension. The process flow 500 describes an example where routes are described by lane segments, similar to the example of FIG. 2. The vehicle autonomy system can generate a route by moving iteratively to select the least cost (or highest reward) lane segment transition from each new lane segment. At operation 502, the vehicle autonomy system accesses a current lane segment. The current late segment can be a lane segment where the vehicle is currently present. At operation 504, the vehicle autonomy system accesses a cost associated with next lane segments. The next lane segments are lane segments that the vehicle could traverse to from the current lane segments. At operation 506, the vehicle autonomy system selects the next lane segment based on the costs. For example, the next lane segment can be the next lane segment with the lowest cost.

Figure 6:
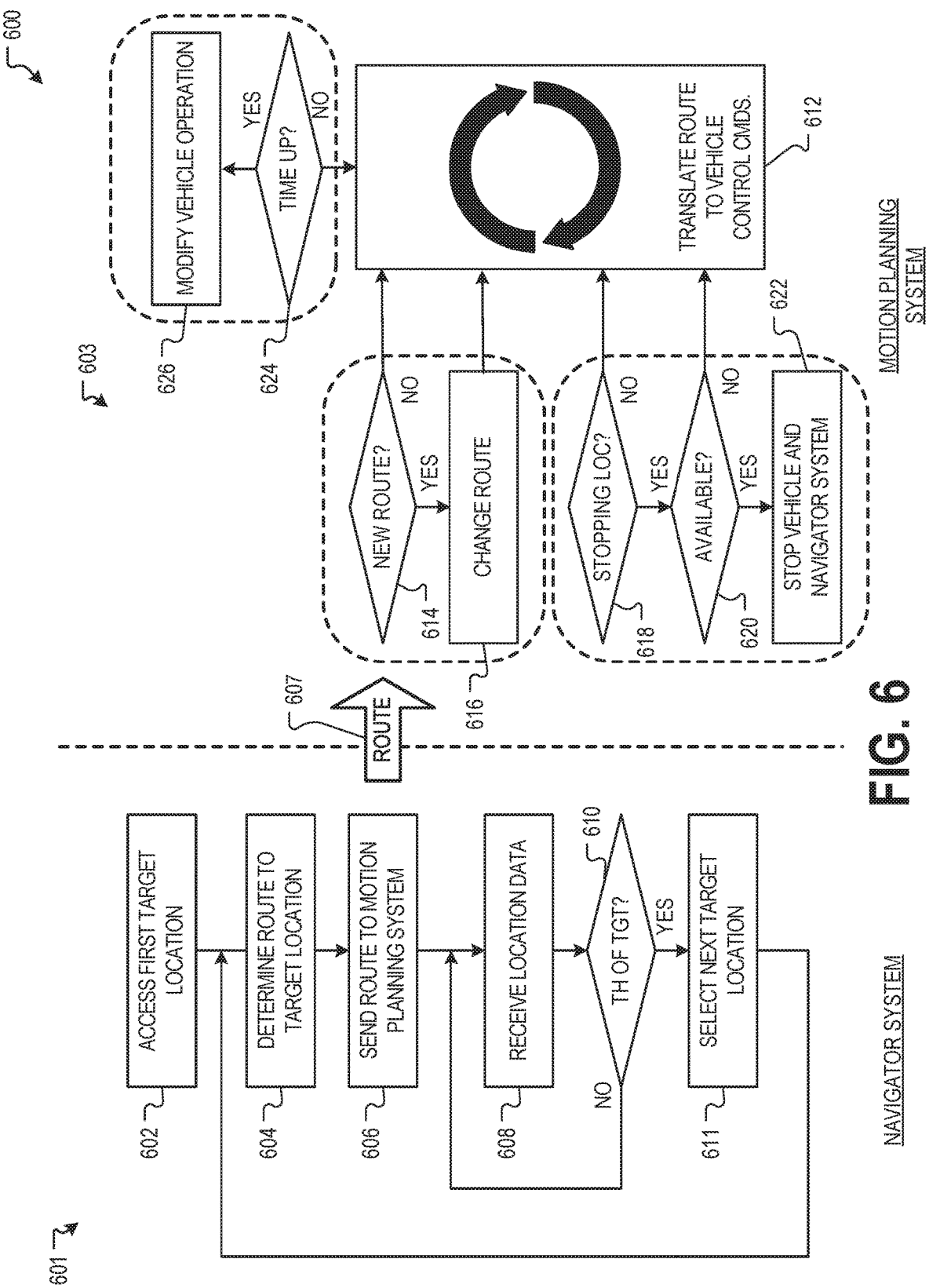
FIG. 6 is a flowchart showing one example of a process flow that can be executed by a vehicle autonomy system to generate and implement a route for an autonomous vehicle.

FIG. 6 is a flowchart showing one example of a process flow 600 that can be executed by a vehicle autonomy system to generate and implement a route for an autonomous vehicle. The process flow 600 includes two columns 601, 603. The column 601 includes operations that are executed by a navigator system. The column 603 includes operations that can be executed by a motion planning system.

In the process flow 600, the navigator system generates route data that is provided to the motion planning system via one or more route plan messages 607. Route data can describe an initial route to a first target location and/or a route extension to an extended target location. For example, the navigator system can generate initial route data describing a route to an initial target location. When vehicle location data from a localizer system indicates that the vehicle is within the threshold of the initial target location, the navigator system generates a route extension to a new target location. Route data describing the route extension is provided to the motion planning system via a new route plan message 607.

At operation 602, the navigator system accesses a first target location. The first target location can be associated with one or more stopping locations, as described herein. At operation 604, the navigator system determines a route to the target location (e.g., the target location determined at operation 602). At operation 606, the navigator system sends a route plan message 607 to the motion planning system. The route plan message 607 includes route data describing the route to the target location determined at operation 604.

At operation 608, the navigator system receives location data describing a current location of the vehicle. The location data can be a pose or pose estimate generated by a localizer, a position reading from a GPS sensor, or other suitable indicator of the vehicle's location. At operation 610, the navigator system determines if the vehicle's location is within a threshold of the target location. The threshold can be, for example, a distance threshold, a time threshold, a conjunctive combination of a time threshold and a distance threshold, or a disjunctive combination of a time threshold and a distance threshold.

If the vehicle is not within the threshold of the target location, the navigator system receives new location data at operation 608. If the vehicle is within the threshold of the target location, the navigator system selects a next target location at operation 611. The navigator system can return to operation 604 to determine a route extension to the next target location. At operation 606, the navigator system sends to the motion planning system a route plan message 607 including route data describing the route extension. The route data describing the route extension can describe the route extension only (e.g., from the initial target location to the new target location) or can describe the initial route extended to the new target location.

The motion planning system executes a motion planning loop 612. In executing the motion planning loop 612, the motion planning system translates the current route indicated by route data from the route plan messages 607 to commands directed to the vehicle's controls. For example, the motion planning system can generate control commands considering the route data 607, map data, and information about other objects in the vehicle's environment, as described herein. The motion plan is translated into commands to the brakes, steering, throttle, and/or other vehicle controls.

Upon receiving a route plan message 607, the motion planning system can, at operation 614, determine if the route plan message 607 includes route data describing a new route (e.g., a route different than the route currently being executed by the motion planning loop 612). For example, if the route data describes a route extension, it may be different than the route currently being executed by the motion planning loop 612. If the route plan message 607 describes a new route, the motion planning system, at operation 616, changes the route being implemented by the motion planning loop 612. The motion planning system implements the new route or described by the route plan message 607 and resumes generating control commands, for example, according to the new route.

The motion planning loop 612 can also respond when the motion planning system receives an indication that sensor data shows a stopping location. For example, the route data provided to the motion planning loop 612 (e.g., via a route plan message 607) can describe stopping locations associated with a route or route extension. If the motion planning system receives an indication that a stopping location is approaching and that the stopping location is available, then the motion planning system generates control commands to stop the vehicle at the stopping location. For example, at operation 618 the motion planning system determines if sensor data indicates a stopping location. If no stopping location is present, the motion planning system continues to execute the motion planning loop.

If sensor data indicates a stopping location at operation 618, the motion planning system, at operation 620, determines whether the stopping location is available. The stopping location is available, for example, if sensor data indicates that there is currently no other vehicle at the stopping location. If the stopping location is not available, the motion planning system continues to execute the motion planning loop 612. If the stopping location is available, the motion planning system, at operation 622, generates commands to stop the vehicle at the available stopping location.

The motion planning loop 612 can also be interrupted, for example, if a user instructs the vehicle to stop and/or if the vehicle has failed to locate an available stopping location after more than a threshold amount of driving (e.g., a threshold number of miles, a threshold time). For example, at operation 624, the motion planning system determines if a threshold driving time has expired. (In some examples, the motion planning system also determines at operation 624 whether the user has instructed the vehicle to stop). If the threshold driving time has not expired and the user has not instructed the vehicle to stop, the motion planning system continues to execute the motion planning loop 612. If the threshold driving time has expired or the user has instructed the vehicle to stop, the motion planning system modifies the vehicle's operation at operation 626. This can include stopping the vehicle, causing the vehicle to pull-over, causing the vehicle to return to a base station or other fixed location, etc.

In some examples, the motion planning loop 612 is interrupted to execute the operation 614, 616, 618, 620, 622, 624, 626 upon receiving a route plan message 607. In other examples, the motion planning loop 612 continues to execute while the operations 614, 616, 618, 820, 622, 624, 626 are executed. For example, the operations 614, 616, 618, 820, 622, 624, 626 may be executed by one or more threads different than one or more threads executing the motion planning loop 612.

Figure 7:
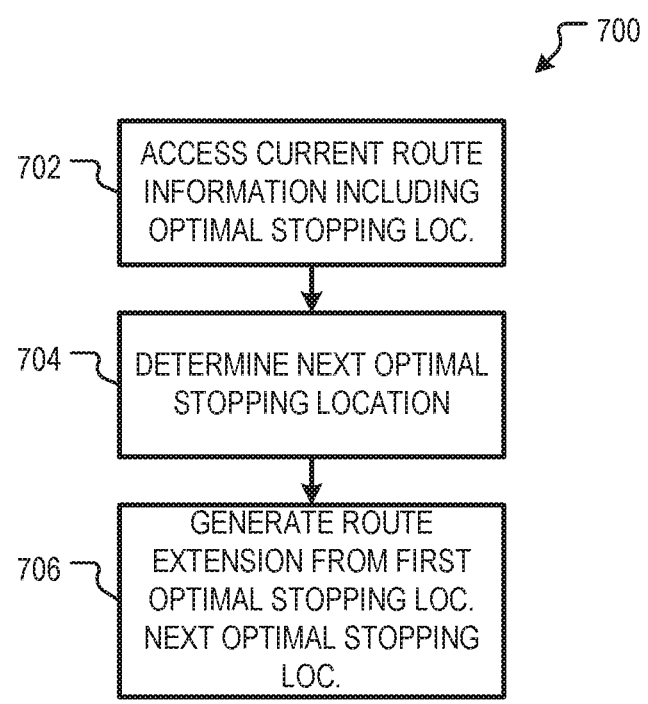
FIG. 7 is a flowchart showing one example of a process flow that may be executed by a vehicle autonomy system to determine a route extension.

FIG. 7 is a flowchart showing one example of a process flow 700 that may be executed by a vehicle autonomy system (e.g., a navigator system thereof) to determine a route extension. For example, the process flow 700 is one example way that the navigator system can determine a route to a new target location as described by operation 604 of the process flow 600 above. In the process flow 700, the route extension is determined based on a utility ranking of stopping locations near the initial target location. For example, one or more highest-ranked stopping locations are selected to generate an initial route. Other, lower-ranked, stopping locations are selected for route extensions.

At operation 702, the vehicle autonomy system accesses current route data describing a current route including an optimal stopping location for the route. The optimal stopping location can be the stopping location that has the highest utility relative to the target location. At operation 704, the vehicle autonomy system determines a next optimal stopping location. The next optimal stopping location can be the stopping location that has the next highest utility relative to the target location. At operation 706, the vehicle autonomy system generates a route extension from the first target location to the next optimal stopping location. Route data describing the route extension can be provided to a motion planning system of the vehicle autonomy system, for example, as described with respect to FIG. 6.

Figure 8:
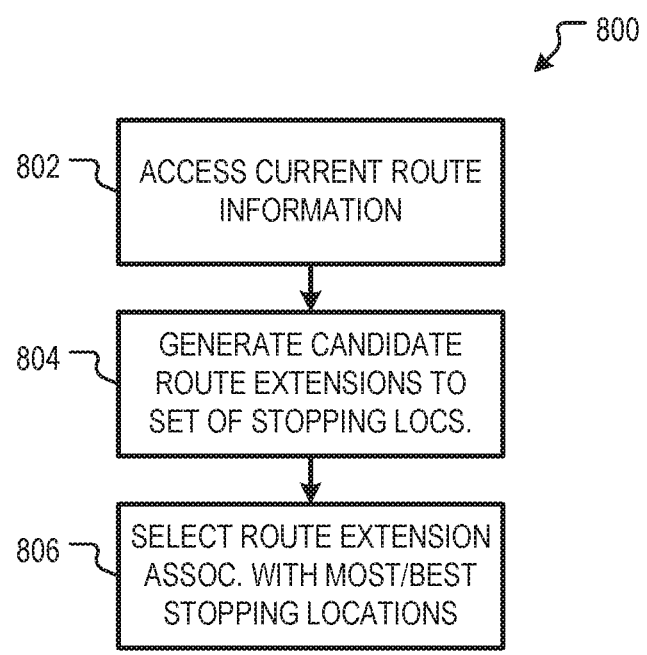
FIG. 8 is a flowchart showing one example of a process flow that may be executed by a vehicle autonomy system to determine a route extension.

FIG. 8 is a flowchart showing one example of a process flow 800 that may be executed by a vehicle autonomy system (e.g., a navigator system thereof) to determine a route extension. For example, the process flow 800 is another example way that the navigator system can determine a route to a new target location as described by operation 604 of the process flow 600 above. In the process flow 800, the route extension is determined by generating a number of candidate route extensions. The route extension for implementation is selected from the candidate route extensions, for example, based on the number of stopping locations passed on the route extension or on a utility ranking of stopping locations near the initial target location. For example, one or more highest-ranked stopping locations are selected to generate an initial route. Other, lower-ranked, stopping locations are selected for route extensions.

At operation 802, the vehicle autonomy system accesses current route data describing a current route. At operation 804, the vehicle autonomy system generates a set of candidate route extensions. Candidate route extensions are potential extensions to the current route. At operation 806, the vehicle autonomy system selects the candidate route extension associated with the most and/or the best (e.g., highest utility) stopping locations. The selected route extension can be provided to a motion planning system of the vehicle autonomy system, for example, as described herein with respect to FIG. 6.

Figure 9:
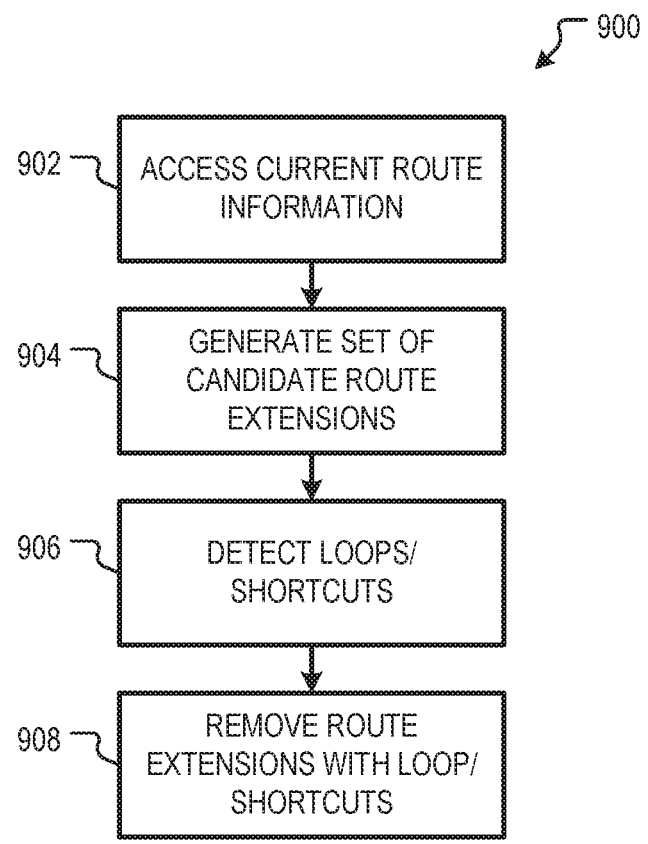
FIG. 9 is a flowchart showing one example of a process flow that may be executed by a vehicle autonomy system to determine a route extension.

FIG. 9 is a flowchart showing one example of a process flow 900 that may be executed by a vehicle autonomy system (e.g., a navigator system thereof) to determine a route extension. In the process flow 900, the vehicle autonomy system considers a set of candidate route extensions. Route extensions that include a loop or short cut are excluded or disfavored. In some examples, the process flow 900 is used as all or part of executing the operation 806 of the process flow 800.

At operation 902, the vehicle autonomy system accesses current route data describing a current route being implemented by the motion planning system of the vehicle autonomy system. At operation 904, the vehicle autonomy system generates a set of candidate route extensions.

At operation 906, the vehicle autonomy system detects candidate route extensions generated at operation 904 that include a loop and/or a short cut. The detection at operation 906 can be performed in any suitable manner. For example, the target for a route extension can be associated with a set of stopping locations. A route extension that includes a short cut can be a route extension that does not pass all of the stopping locations associated with the target location of the route extension. A route extension with a loop can be a route extension that passes some or all of the stopping locations associated with the target location of the route extension more than once. The vehicle autonomy system can remove from consideration any of the candidate route extensions that include a loop or short cut at operation 908.

Figure 10:
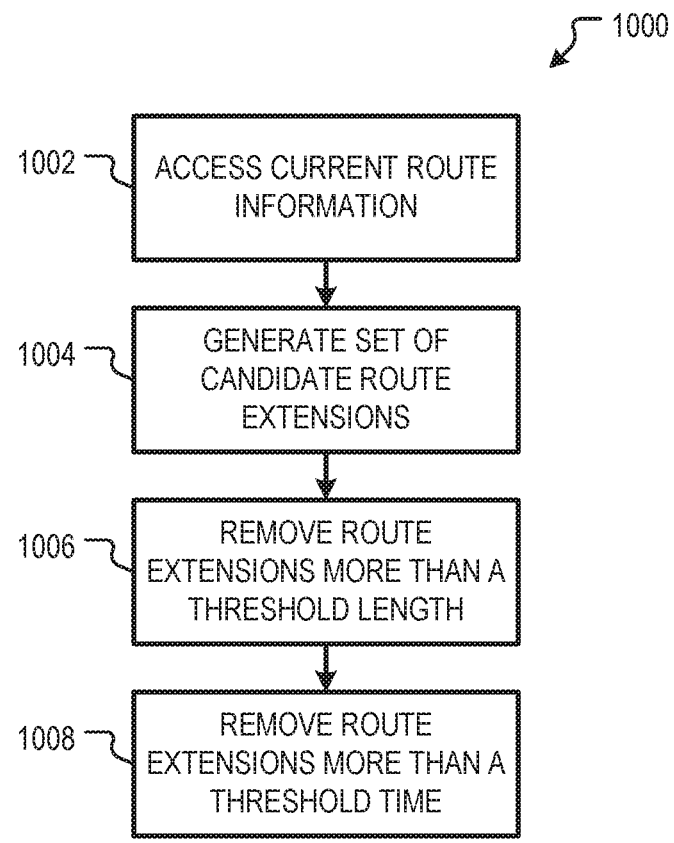
FIG. 10 is a flowchart showing one example of a process flow that may be executed by a vehicle autonomy system to determine a route extension.

FIG. 10 is a flowchart showing one example of a process flow 1000 that may be executed by a vehicle autonomy system (e.g., a navigator system thereof) to determine a route extension. In the process flow 1000, the navigator system removes from consideration or disfavors route extensions that are of more than a threshold length and/or more than a threshold time. In this way, as described herein, the likelihood of the motion planning system implementing the route extension with a loop or short cut may be reduced. In some examples, the process flow 1000 is used as all or part of executing the operation 806 of the process flow 800.

At operation 1002, the vehicle autonomy system accesses current route information. At operation 1004, the vehicle autonomy system generates a set of candidate route extensions. At operation 1006, the vehicle autonomy system removes from consideration candidate route extensions that are more than a threshold length. The threshold length can be selected in any suitable manner. For example, the threshold length can be based on the lengths of the candidate route extensions. (E.g., route extensions with a length more than X % longer than the average or median route extension length.)

At operation 1008, the vehicle autonomy system can remove from consideration candidate route extensions that take more than a threshold time to traverse. The threshold time can be selected in any suitable manner. For example, the threshold time can be based on the time to traverse the candidate route extensions. (E.g., route extensions with a time to travers that is more than Y % longer than the average or median of the time to traverse all of the candidate route extensions).

Figure 11:
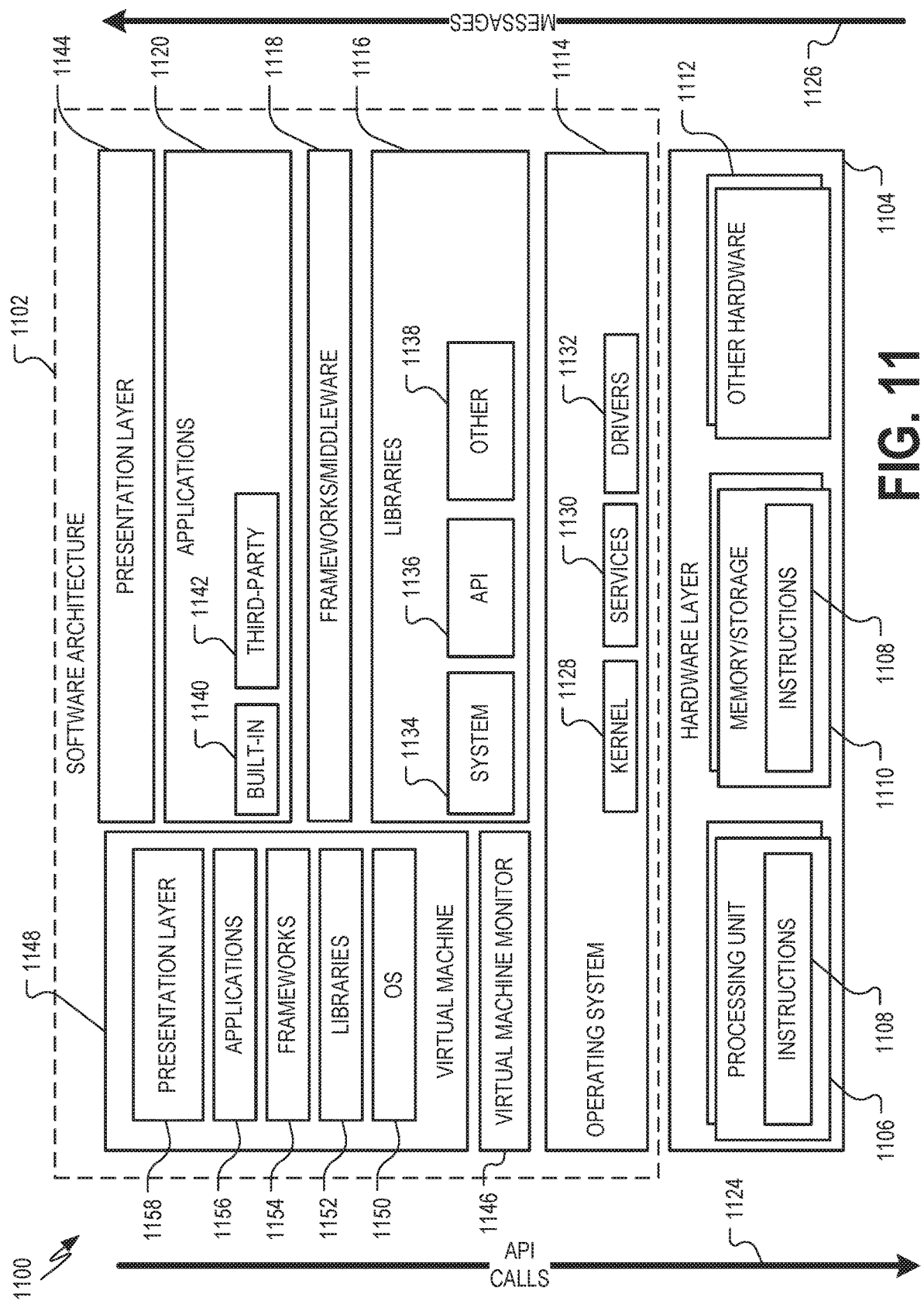
FIG. 11 is a block diagram 1100 showing one example of a software architecture for a computing device.

FIG. 11 is a block diagram 1100 showing one example of a software architecture 1102 for a computing device. The software architecture 1102 may be used in conjunction with various hardware architectures, for example, as described herein. FIG. 11 is merely a non-limiting example of a software architecture 1102 and many other architectures may be implemented to facilitate the functionality described herein. A representative hardware layer 1104 is illustrated and can represent, for example, any of the above-referenced computing devices. In some examples, the hardware layer 1104 may be implemented according to an architecture 1200 of FIG. 12 and/or the software architecture 1102 of FIG. 11.

The representative hardware layer 1104 comprises one or more processing units 1106 having associated executable instructions 1108. The executable instructions 1108 represent the executable instructions of the software architecture 1102, including implementation of the methods, modules, components, and so forth of FIGS. 1-10. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the architecture 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke API calls 1124 through the software stack and receive a response, returned values, and so forth illustrated as messages 1126 in response to the API calls 1124. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the software architecture 1102 to pause its current processing and execute an ISR when an interrupt is received. The ISR may generate an alert.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be used by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be used by the applications 1120 and/or other software components/modules. For example, the frameworks 1118 may provide various graphical user interface (GUI) functions, high-level resource management, high-level location services, and so forth. The frameworks 1118 may provide a broad spectrum of other APIs that may be used by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1142 may invoke the API calls 1124 provided by the mobile operating system such as the operating system 1114 to facilitate functionality described herein.

The applications 1120 may use built-in operating system functions (e.g., kernel 1128, services 1130, and/or drivers 1132), libraries (e.g., system libraries 1134, API libraries 1136, and other libraries 1138), or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 11, this is illustrated by a virtual machine 1148. A virtual machine creates a software environment where applications/modules can execute as if they were executing on a hardware computing device. The virtual machine 1148 is hosted by a host operating system (e.g., the operating system 1114) and typically, although not always, has a virtual machine monitor 1146, which manages the operation of the virtual machine 1148 as well as the interface with the host operating system (e.g., the operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Figure 12:
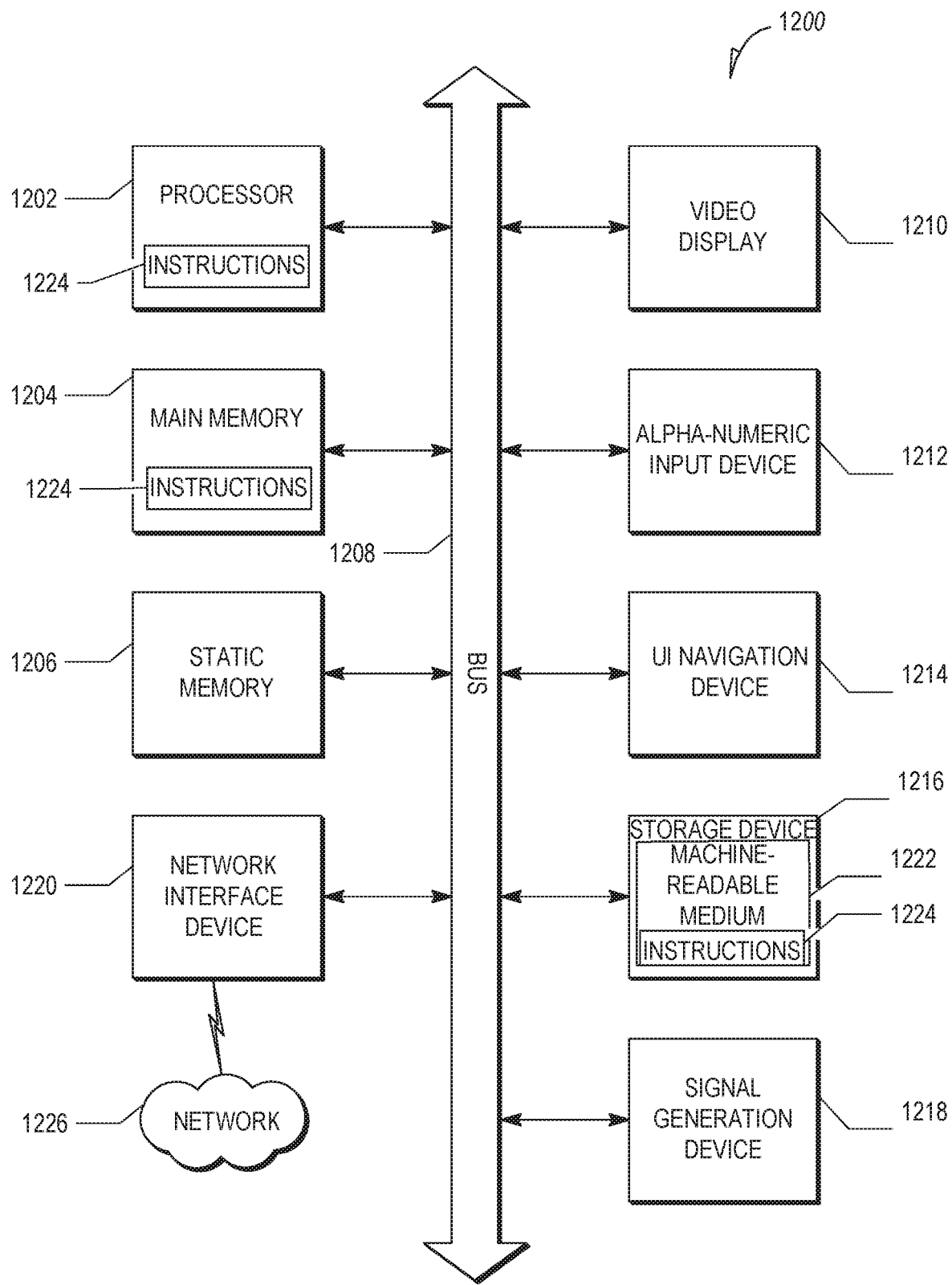
FIG. 12 is a block diagram illustrating a computing device hardware architecture, within which a set or sequence of instructions can be executed to cause a machine to perform examples of any one of the methodologies discussed herein.

FIG. 12 is a block diagram illustrating a computing device hardware architecture 1200, within which a set or sequence of instructions can be executed to cause a machine to perform examples of any one of the methodologies discussed herein. The hardware architecture 1200 describes a computing device for executing the vehicle autonomy system, described herein.

The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1200 includes a processor unit 1202 comprising at least one processor (e.g., a central processing unit (CPU), a graphics processing unit (GPU), or both, processor cores, compute nodes). The architecture 1200 may further comprise a main memory 1204 and a static memory 1206, which communicate with each other via a link 1208 (e.g., bus). The architecture 1200 can further include a video display unit 1210, an input device 1212 (e.g., a keyboard), and a UI navigation device 1214 (e.g., a mouse). In some examples, the video display unit 1210, input device 1212, and UI navigation device 1214 are incorporated into a touchscreen display. The architecture 1200 may additionally include a storage device 1216 (e.g., a drive unit), a signal generation device 1218 (e.g., a speaker), a network interface device 1220, and one or more sensors (not shown), such as a Global Positioning System (G) sensor, compass, accelerometer, or other sensor.

In some examples, the processor unit 1202 or another suitable hardware component may support a hardware interrupt. In response to a hardware interrupt, the processor unit 1202 may pause its processing and execute an ISR, for example, as described herein.

The storage device 1216 includes a non-transitory machine-readable medium 1222 on which is stored one or more sets of data structures and instructions 1224 (e.g., software) embodying or used by any one or more of the methodologies or functions described herein. The instructions 1224 can also reside, completely or at least partially, within the main memory 1204, within the static memory 1206, and/or within the processor unit 1202 during execution thereof by the architecture 1200, with the main memory 1204, the static memory 1206, and the processor unit 1202 also constituting machine-readable media.

Executable Instructions and Machine-Storage Medium

The various memories (i.e., 1204, 1206, and/or memory of the processor unit(s) 1202) and/or storage device 1216 may store one or more sets of instructions and data structures (e.g., instructions) 1224 embodying or used by any one or more of the methodologies or functions described herein. These instructions, when executed by processor unit(s) 1202 cause various operations to implement the disclosed examples.

As used herein, the terms "machine-storage medium," "device-storage medium," "computer-storage medium" (referred to collectively as "machine-storage medium 1222") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1222 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1222 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1224 can further be transmitted or received over a communications network 1226 using a transmission medium via the network interface device 1220 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A system for controlling an autonomous vehicle, comprising:
  at least one processor; and
  a storage device storing instructions that, when executed by the at least one processor, causes the at least one processor to perform operations comprising:
    generating first route data describing a first route for the autonomous vehicle to a first target location, the first target location associated with a first stopping location;
    controlling the autonomous vehicle using the first route data;
    determining that the autonomous vehicle is within a threshold of the first target location;
    selecting a second target location, the second target location associated with at least a second stopping location;
    generating second route data describing a route extension of the first route from the first target location to the second target location; and
    controlling the autonomous vehicle using the second route data.

2. The system of claim 1, wherein determining that the autonomous vehicle is within the threshold of the first target location includes determining that an estimated time before the autonomous vehicle arrives at the first target location is less than a threshold time.

3. The system of claim 1, wherein determining that the autonomous vehicle is within the threshold of the first target location includes determining that the autonomous vehicle is within a threshold distance of the first target location.

4. The system of claim 1, wherein the operations further comprise generating a ranking of stopping locations associated with the first target location, wherein the ranking of stopping locations includes the first stopping location and the second stopping location, wherein the selecting of the second target location is based at least in part on the ranking.

5. The system of claim 1, wherein the operations further comprise, before selecting the second target location:
  generating a candidate second target location; and
  determining that the candidate second target location is farther than an extension threshold distance from the first target location.

6. The system of claim 1, wherein the operations further comprise, before selecting the second target location:
  generating a candidate second target location; and
  determining that a time for the autonomous vehicle to travel from the first target location to the candidate second target location is greater than an extension threshold time.

7. The system of claim 1, wherein the operations further comprise:
  generating a set of candidate route extensions from the first target location, the set of candidate route extensions including the route extension; and
  determining that the route extension passes more stopping locations than a second route extension of the set of candidate route extensions.

8. The system of claim 1, wherein controlling the autonomous vehicle using the second route data comprises:
  providing, by a navigator system, the second route data to a motion planning system;
  generating, by the motion planning system, a control command to a first vehicle control using the second route data; and
  sending the control command to the first vehicle control.

9. The system of claim 8, wherein the operations further comprise:
  determining, by the motion planning system, that a stopping location is available; and
  stopping the autonomous vehicle at the stopping location by the motion planning system.

10. A method for routing an autonomous vehicle, the method comprising:
  generating first route data describing a first route for the autonomous vehicle to a first target location, the first target location associated with a first stopping location;
  controlling the autonomous vehicle using the first route data;
  determining that the autonomous vehicle is within a threshold of the first target location;

selecting a second target location, the second target location associated with at least a second stopping location;

generating second route data describing a route extension of the first route from the first target location to the second target location; and controlling the autonomous vehicle using the second route data.

11. The method of claim 10, wherein determining that the autonomous vehicle is within the threshold of the first target location includes determining that an estimated time before the autonomous vehicle arrives at the first target location is less than a threshold time.

12. The method of claim 10, wherein determining that the autonomous vehicle is within the threshold of the first target location includes determining that the autonomous vehicle is within a threshold distance of the first target location.

13. The method of claim 10, further comprising generating a ranking of stopping locations associated with the first target location, wherein the ranking of stopping locations includes the first stopping location and the second stopping location, wherein the selecting of the second target location is based at least in part on the ranking.

14. The method of claim 10, further comprising, before selecting the second target location:

generating a candidate second target location; and determining that the candidate second target location is farther than an extension threshold distance from the first target location.

15. The method of claim 10, further comprising, before selecting the second target location:

generating a candidate second target location; and determining that a time for the autonomous vehicle to travel from the first target location to the candidate second target location is greater than an extension threshold time.

16. The method of claim 10, further comprising:

generating a set of candidate route extensions from the first target location, the set of candidate route extensions including the route extension; and determining that the route extension passes more stopping locations than a second route extension of the set of candidate route extensions.

17. The method of claim 10, wherein controlling the autonomous vehicle using the second route data comprises:

providing, by a navigator system, the second route data to a motion planning system;

generating, by the motion planning system, a control command to a first vehicle control using the second route data; and sending the control command to the first vehicle control.

18. The method of claim 17, further comprising:

determining, by the motion planning system, that a stopping location is available; and stopping the autonomous vehicle at the stopping location by the motion planning system.

19. A non-transitory machine-readable medium comprising instructions thereon that, when executed by at least one processor, cause the at least one processor to perform operations comprising:

generating first route data describing a first route for an autonomous vehicle to a first target location, the first target location associated with a first stopping location;

controlling the autonomous vehicle using the first route data;

determining that the autonomous vehicle is within a threshold of the first target location;

selecting a second target location, the second target location associated with at least a second stopping location;

generating second route data describing a route extension of the first route from the first target location to the second target location; and controlling the autonomous vehicle using the second route data.

20. The medium of claim 19, wherein determining that the autonomous vehicle is within the threshold of the first target location includes determining that an estimated time before the autonomous vehicle arrives at the first target location is less than a threshold time.

* * * * *